United States Patent
Gremaud

(10) Patent No.: US 9,942,212 B2
(45) Date of Patent: Apr. 10, 2018

(54) COMMUNICATION DEVICE AND SYSTEM, DATA PROCESSING METHOD AND METHOD FOR SECURE DATA EXCHANGE

(71) Applicant: Nagravision S.A., Cheseaux-sur-Lausanne (CH)

(72) Inventor: Fabien Gremaud, Chatel St. Denis (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 140 days.

(21) Appl. No.: 14/965,254

(22) Filed: Dec. 10, 2015

(65) Prior Publication Data

US 2016/0182478 A1   Jun. 23, 2016

(30) Foreign Application Priority Data

Dec. 19, 2014   (EP) .................................... 14199456

(51) Int. Cl.
 *H04L 29/06* (2006.01)
 *H04L 9/06* (2006.01)
 *H04L 9/08* (2006.01)

(52) U.S. Cl.
 CPC .......... *H04L 63/068* (2013.01); *H04L 9/0662* (2013.01); *H04L 9/0861* (2013.01); *H04L 63/0428* (2013.01); *H04L 63/0435* (2013.01)

(58) Field of Classification Search
None
See application file for complete search history.

(56) References Cited

U.S. PATENT DOCUMENTS

| 8,438,401 B2 * | 5/2013 | Milliken ................. G06F 21/71 713/189 |
| 9,083,509 B2 * | 7/2015 | Buckley .................... H04L 9/08 |
| 2006/0062384 A1 | 3/2006 | Dondeti |

(Continued)

FOREIGN PATENT DOCUMENTS

EP   1693982 A2   8/2006

OTHER PUBLICATIONS

European Search Report dated Jun. 25, 2015, issued in European Application No. 14199456.6.

*Primary Examiner* — Amir Mehrmanesh
(74) *Attorney, Agent, or Firm* — Harness, Dickey & Pierce, P.L.C.

(57) ABSTRACT

The present invention relates to a method for processing data in a communication device comprising a host and a security module associated with this host. This method comprises the steps of generating, by the security module, a plurality of initial keys from an initial keys generation function, and of transmitting said plurality of initial keys to said corresponding host. For each initial key received by the host, the method comprises a step of generating a plurality of encryption keys by an extension module of said host, by using an extension function. The method further comprises the steps of receiving the data to be processed by said host and of combining said data to be processed with said encryption keys, in a combination module of said host.
The invention further concerns a communication device and a communication system allowing for the implementation of this method, as well as a method allowing the secure exchange of data between two communication devices.

15 Claims, 2 Drawing Sheets

(56) References Cited

U.S. PATENT DOCUMENTS

| | | | |
|---|---|---|---|
| 2008/0235510 A1* | 9/2008 | Wolf | H04L 9/085 713/161 |
| 2009/0217053 A1* | 8/2009 | Furukawa | G06F 9/544 713/187 |
| 2012/0033804 A1 | 2/2012 | Soquet | |
| 2013/0225151 A1* | 8/2013 | King | H04M 1/72577 455/419 |
| 2014/0192979 A1 | 7/2014 | Dondeti | |
| 2016/0226830 A1* | 8/2016 | Steeves | H04L 63/0428 |

* cited by examiner

COMMUNICATION DEVICE AND SYSTEM, DATA PROCESSING METHOD AND METHOD FOR SECURE DATA EXCHANGE

CROSS REFERENCE TO RELATED APPLICATIONS

This application claims priority under 35 U.S.C. Section. 119 to European patent application No EP 14199456.6, entitled "Dispositif et système de communication, méthode de traitement de données et méthode d'échange sécurisé de données" filed Dec. 19, 2014, the contents of which are hereby incorporated by reference herein.

TECHNICAL FIELD

This invention is used for data encryption, in particular for the encryption of the voice, and possibly other data, by an encryption module having a low encryption speed.

More specifically, this invention relates to a communication device comprising a security module and a host. It also concerns a communication system comprising at least two communication devices intended to exchange data in a secure form with each other, each communication device comprising a security module associated with a host. The invention further concerns a data processing method in a communication device comprising a host and a security module associated with this host. The invention also concerns a method for secure data exchange between at least two communication devices each comprising a host and a security module associated with this host.

BACKGROUND ART

In certain existing systems used for encrypting data such as in particular the voice, a communication device formed by a security module and a host is used. The data stream to be encrypted is received by the host, then sent to the security module. The latter encrypts the data and sends it back to the host when the encryption is terminated. The host can then transmit this data to another communication device.

The transfer from the host towards the security module, the encryption in this module and the return from the module towards the host need a relatively long duration, which introduces an important latency period. Moreover, with a security module with weak encryption capacities, as this is for example the case with conventional smart cards, there may be a flow problem if the encryption cannot be done as rapidly as the flow of the voice or data to be transmitted.

For solving this problem, an encryption method has been developed. According to this method, two devices which have to exchange encrypted data generate a common session key. This session key, generally generated in the security module, is transmitted to an extension module of the corresponding host. This extension module comprises an extension function which generates a plurality of keys from an initial key. The keys thus generated are used for encrypting the data by a conventional stream encryption. This method is known as "Secure Real-time Transport Protocol" or SRTP.

Although this method works for encrypting data such as the voice, which requires the generation of a large number of keys during short time intervals, the knowledge of the session key might compromise the security of the system. Indeed, as the host is not an element placed in a secure environment, it is not excluded that the extension function may be found and used for decrypting content illegally.

This invention proposes to realize a device, a system and a method allowing improving security, while having a small latency period.

SUMMARY

This invention relates to a communication device as defined in the preamble and wherein the security module comprises at least one initial keys generator using an initial keys generation function, wherein the host comprises reception device for said initial keys, an extension module and a combination module, wherein the extension module has an extension function for generating a plurality of encryption keys from each of said initial keys, wherein the combination module comprises data reception device and reception device for said encryption keys, and wherein this combination module has a combination function for combining said data with said encryption keys.

According to a preferred embodiment, the device of the invention comprises a device configured to determine the number of encryption keys necessary during a determined time interval and a device configured to adapt the number of encryption keys generated during said determined time interval.

The host advantageously comprises a memory to memorize at least one initial key received from the security module.

The device of the invention advantageously comprises at least one counter.

This invention also concerns a communication system as defined in the preamble and wherein each security module comprises at least one initial keys generator having an initial key generation function, wherein each host comprises reception device for said initial keys generated by the corresponding security module, wherein each host further comprises an extension module and a combination module, wherein the extension module has an extension function for generating a plurality of encryption keys from each of said initial keys received from the corresponding security module, wherein the combination module comprises reception device for data to be processed and reception device for said encryption keys, and wherein this combination module has a combination function for combining the data to be processed with said encryption keys.

According to a particular embodiment of the invention, the initial keys generation functions for the two distinct security modules are different, wherein the extension functions of two distinct hosts are different and wherein the combination in the combination module of one of the communication devices, of said keys coming from the corresponding extension module with encrypted data coming from another communication device leads to the unencrypted data.

According to a variant of the invention, the initial keys generation functions and the extension functions of two different communication devices are such that, by using an identical session key, the result is a stream of identical encryption keys.

The invention further concerns a method for data processing such as defined in the preamble, this method comprising the following steps:

generating, by the security module, a plurality of initial keys from an initial keys generation function;
transmitting said plurality of initial keys to said corresponding host;

for each initial key received by the host, generating a plurality of encryption keys by an extension module of said host, by an extension function;

receiving by said host the data to be processed;

combination of said data to be processed with said encryption keys, in a combination module of said host.

According to an advantageous embodiment of the invention, the initial keys generation function uses a session key as input variable. This session key is preferably negotiated between at least two communication devices during the establishment of a communication between these two devices.

According to another variant, said session key is received by the security module from an external source.

According to one embodiment of the invention, each initial key is associated with an index before transmitting the initial keys and of the indexes to the corresponding host.

According to a particular variant of the invention, the extension function generates, for each received initial key, a predefined number of encryption keys.

According to another variant, the number of encryption keys generated for an initial key depends on a parameter depending on the data to be processed.

The invention further concerns a method for secure data exchange such as defined in the preamble, this method comprising the following steps:

generating initial keys in said security module of each communication device, this generation of initial keys being realized by an initial keys generation function;

transmitting said initial keys generated from the security modules to the corresponding host;

from each of the initial keys received by the host, generating a plurality of encryption keys;

receiving data to be processed by one of said hosts; and combining said data to be processed with the encryption keys generated by this host, in a combination module.

The generation of the initial keys advantageously uses a session key as initial parameter.

According to a particular embodiment of the invention, the initial keys and the extension function of two different communication devices are identical.

According to another embodiment of the invention, the initial keys of two communication devices are different, wherein the extension functions of said two communication devices are different and wherein the keys generated from said initial keys and the extension function are identical for the two different communication devices.

The host advantageously comprises a device configured to determine a quantity of keys per time unit to be generated and a device configured to act on the extension function according to the number of keys per time unit which have been determined by said a device configured to determine a quantity of keys per time unit to be generated.

According to this invention, when several communication devices have to exchange encrypted data, in the first place they negotiate a session key or they receive information from a secure external source. Starting from this element, they generate a plurality of keys called initial keys. These initial keys are transmitted to a module which comprises an extension function which, from an initial key, generates several encryption keys. The encryption keys generated in this way are used for encrypting the data.

According to one embodiment, the initial keys can be identical in the different communication devices. In this case, compared to the systems of prior art, the security is improved as the knowledge of the session key or the information coming from an external source does not allow to calculate the keys which are used for the encryption.

According to another embodiment, the initial keys are different for different communication devices. These different initial keys are processed so as to lead to identical encryption keys for the different communication devices participating in the same communication. In this case as in the previous one, compared to the systems of prior art, the security is improved as the knowledge of the session key does not allow calculating encryption keys. Furthermore, the discovery of the initial keys used in a communication device does not allow calculating initial keys relating to another communication device.

The invention further has the advantage to adapt in a very flexible way to the constraints of the encryption. In particular, the quantity of generated keys to encrypt data can be adapted in a dynamic way to the quantity of data to be encrypted. This allows to ensure that a sufficient number of keys is available, which implies that there is no increase of the latency period. This invention is thus particularly well adapted to the encryption of voice, where the latency period and the availability of a sufficient number of keys are particularly important, even if the encryption capacity of the devices used is relatively weak.

BRIEF DESCRIPTION OF THE DRAWINGS

This invention and its advantages will be better understood with reference to the enclosed drawings and to the detailed description of a particular embodiment, in which.

WAYS OF REALISING THE INVENTION

Figure 1:
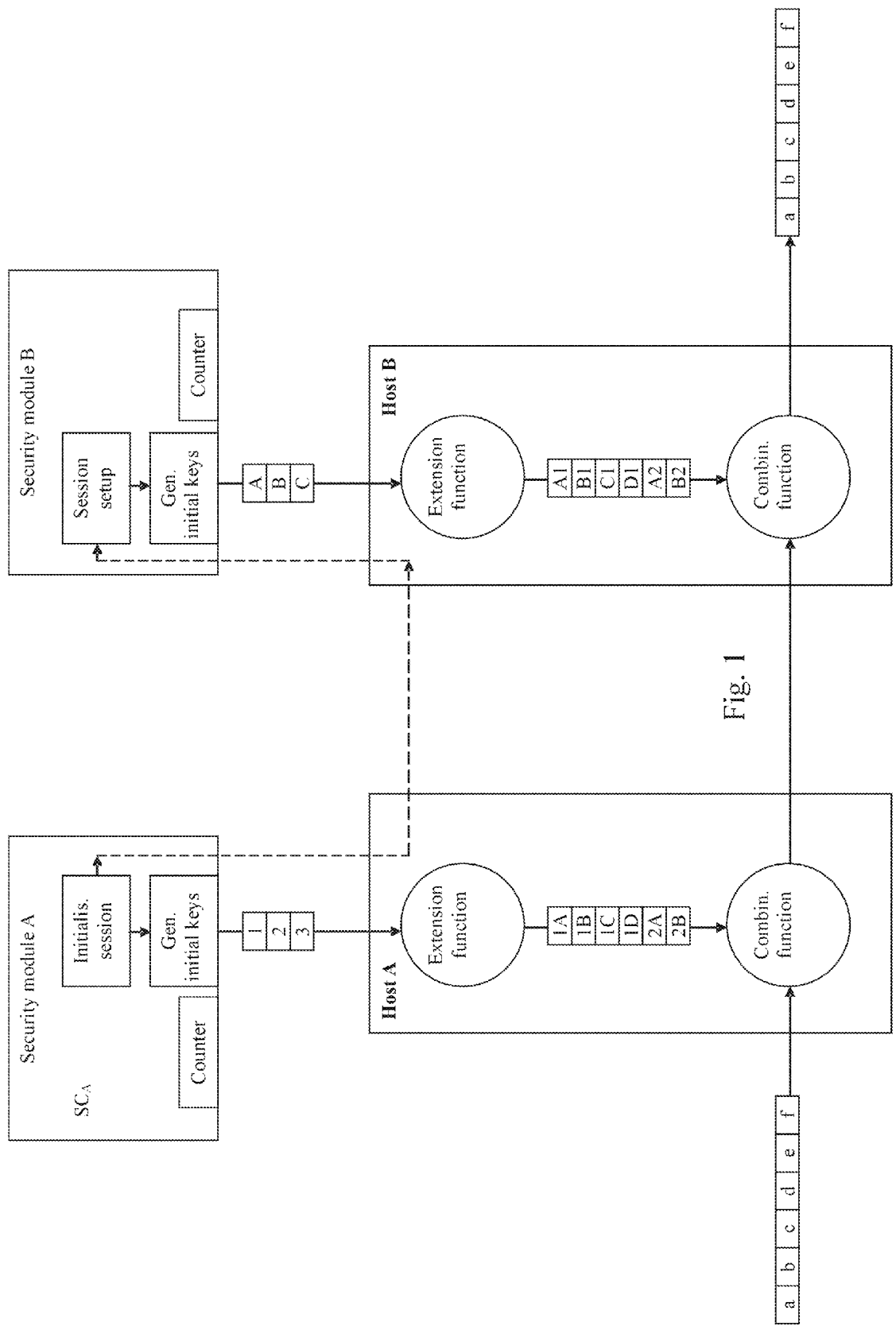
FIG. 1 schematically shows two devices according to the present invention.

With reference to the figures, the invention concerns in particular a communication system formed by several communication devices. Each of these communication devices comprises a host H and a security module SC which can for example be realized in the form of a smart card or a microprocessor. The host can in particular have the form of a mobile phone. In FIG. 1, two communication devices are represented, one comprising a security module indicated as $SC_A$ and a host indicated as $H_A$, the other communication device comprising a security module indicated as $SC_B$ and a host indicated as $H_B$.

The security module comprises at least a device configured to initialize a communication and an initial keys (Seed) generator. The security module further comprises a communication device configured to allow to transmit the initial keys generated in this security module to the host associated with this module. In the illustrated embodiment, the security module further comprises a counter whose function will be explained later.

The host comprises a calculation module comprising at least one extension function $f_{ext}$. This extension function receives as input variable, the initial keys $K_i$ generated by the security module associated with this host. The extension function is such that from an initial key, several resultant keys are generated. Such an extension function could for example be a stream cypher of the type AES-CTR or GRAIN, or the combination of a key derivator, using for example a one-way cryptographic function such as SHA256, which supplies with keys, a symmetrical cryptographic algorithm such as AES for the encryption and the decryption of data.

The host further comprises a combination module, a data reception device, and a data transmission device. In principle, the same device can act as emitter and as receiver. If the device acts as emitter, the data reception device is configured to receive data to be encrypted and the transmission device is configured to transmit encrypted data to another communication device. If the device acts as receiver, it receives encrypted data and decrypts them.

The following description is based on an example in which two communication devices communicate with each other. If more than two devices are connected during the same communication, the method of the invention remains the same, all the communication devices using this same method.

When two communication devices start a communication, they negotiate a session key $S_k$ which is valid in principle for the whole communication and which is changed at each communication. The negotiation of this session key can be done in different known ways which are not explained in detail here.

According to a variant, instead of a session key, it is also possible that the security modules receive information coming from a secure external source. This information in particular allows carrying out an authentication of the communication devices before the beginning of the communication.

For the sake of simplicity, regardless of whether the session key is negotiated between the different concerned communication devices or the session key is generated from information coming from an external source or the session key is directly the information coming from the external source, the expression "session key" will be used here.

This session key $S_k$ is used as input variable of the initial keys generator of the security module. This initial keys generator uses a function noted $f_{init}$, allowing generating keys which are different from each other on the one hand and which are different for a different session key on the other hand. A function which allows generating these initial keys could for example be a stream cypher of the type HC-128 or GRAIN, or a pseudorandom key derivator using one or more one-way cryptographic functions such as SHA256.

According to an advantageous embodiment, the security module comprises a counter. The keys $K_i$ generated by the initial keys generator can be encrypted by a pairing key between the security module and the corresponding host. According to a variant, the initial keys can also be transmitted to the host without encryption. If a counter is provided in the security module, the keys are sent in messages having a value of a counter as header. This counter value is typically incremented by one unit for each message, so that two consecutive keys are associated with two consecutive values of the counter. Instead of an incremental value of a counter, the initial keys can be associated with different synchronization information, such as for example an index value coming from a table. This synchronization information may be public.

When a message containing an initial key is transmitted to the corresponding host, this message is processed in order to extract the initial key. The processing depends here on the formatting of the message. In the simplest case, the initial key is transmitted as it is. It can be simply transmitted with a counter value. It can also be encrypted, then be associated with a counter value. In the last case, it is necessary to extract the value of the counter and afterwards to decrypt the message so as to obtain the initial key.

When an initial key is thus obtained, it is transmitted to the calculation module which contains an extension function. This extension function has the effect and the task of generating several encryption keys from an initial key.

The number of encryption keys that the extension function generates for each initial key, named extension ratio, can be fixed beforehand and remain the same during the whole communication. It can also be fixed, but vary during a data exchange.

This ratio could for example be sent in a message coming from a management centre with which the communication devices are connected. The extension ratio could also depend on another source, for example the value of the initial key. As an example, the number of encryption keys generated for an initial key could be equal to the value corresponding to the four least significant bits of the initial key. This ratio could also depend on the requirements related to the quantity of data to be encrypted. Thus, during a data exchange, when there are few data to be encrypted, the need for keys is low and the number of encryption keys generated for an initial key can also be low. On the other hand, during the periods of this data exchange during which many data are to be encrypted, it is necessary to generate a larger number of encryption keys. The number of encryption keys generated for each initial key will then be increased. This adaptation of the number of generated encryption keys can be done in a dynamic way, for being adapted to the specific requirements at any moment. For this purpose, information related to the quantity of necessary encryption keys is sent to the calculation module in order to adapt the extension function.

The modification of the extension ratio can be communicated by the communication device to the other devices with which it communicates either before modifying this ratio or when the ratio is modified.

The extension ratio can be modified in case of change of conditions of use, for example during the passage from a normal communication between two communication devices to a telephone conference with more than two devices. If the change of extension ratio is not communicated in advance, a latency period is introduced, this latency period existing only for the first data encryption arriving after the change of ratio.

The encryption keys generated by the calculation module using the extension function $f_{ext}$ have in principle a predefined fixed size. According to an advantageous embodiment, the data to be encrypted are separated in packets also having a predefined fixed size, this size being identical to the size of the keys.

The data to be encrypted, separated in packets, as well as the encryption keys are transmitted to the combination module. This combination module then encrypts the data using the encryption keys. According to an advantageous embodiment, the encryption of the data is done using an XOR function.

Such a function has the advantage to offer a very fast encryption. Moreover, the application of a key having served to encrypt data on this encrypted data leads to the unencrypted data. When encrypted data are sent from a first communication device to a second communication device, the combination module can apply to the encrypted data the encryption keys having served to encrypt the data and thus obtain the unencrypted data.

The session key $S_k$ is in principle common to the communication devices which take part in the same communication. According to a first embodiment, the initial keys generated by these communication devices are the same and the encryption keys generated by the extension function are also the same. In this case, the encrypted data received by one of the devices are combined with the encryption keys and the communication device thus obtains the data in the clear.

According to a variant, the session key is the same for all the devices participating in the communication, but the initial keys and the extension function are not the same. In order to be able to decrypt the encrypted data, it is important that the keys generated by the device which works as emitter correspond to the keys generated by the device which works as receiver. In practice, these keys are identical.

According to an actual embodiment, each communication device must have two functions, i.e. a function for the generation of initial keys implemented in the security module and an extension function implemented in the host. These two functions have to be complementary in such a way that the consecutive application of the two functions on the same set of initial values leads to an identical result for two different communication devices, but that the result of the application of the first function on the same set of initial values in two different communication devices leads to a different result.

Such a function unit can for example be formed by the following elements: If $f_{initA}$ is the extension function of the initial keys in the security module $SC_A$, and $f_{initB}$ is the extension function of the initial keys in the security module $SC_b$, $f_{initA}$ can generate a key stream for the host A with a combination using an Exclusive OR function $K_i$ xor HC128 (seed B, ... )

where seed B is an initialization value,
and $f_{initB}$ can generate a key stream for the host B with a combination using an Exclusive OR function $K_i$ xor HC128 (seed A, ... )

where seed A is another initialization value.

Let us define as $f_{extA}$ the extension function in the host $H_A$. We have:

$f_{extA}$=AES-CTR ($F_{initA}$ xor HC128(seed A, ... ))
and $f_{extB}$=AES-CTR ($F_{initB}$ xor HC128(seed B, ... ))
We have $f_{extA}(f_{initA})=f_{extB}(f_{initB})$ The number of keys which have to be used to encrypt data depends of course on the quantity of data to be encrypted. Moreover, an important parameter is the number of keys to be used per time unit. In certain configurations, the number of keys per time unit is fixed for all communications. In this case, it is simply necessary to determine the number of initial keys per time unit that the security module is capable of generating. It is sufficient then to set the extension function or in other words, to choose the extension ratio, in such a way that, from the initial keys, said extension function generates a number of keys per time unit sufficient to fulfil the requirements of the application.

Figure 2:
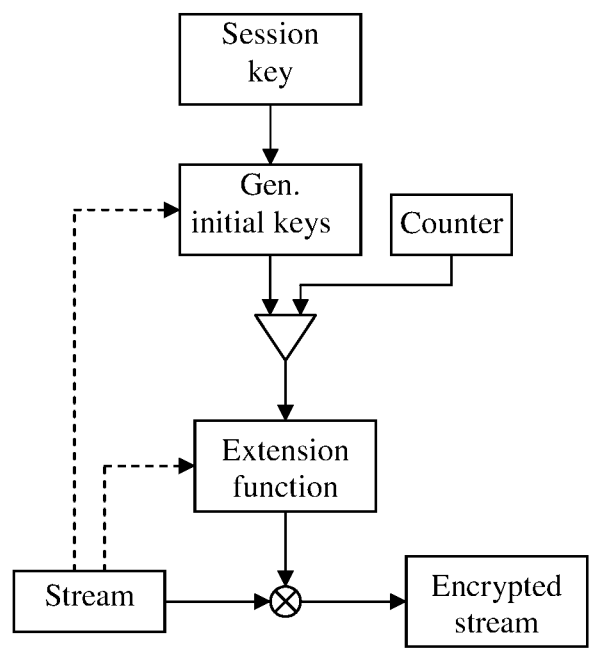
FIG. 2 represents the method according to this invention.

In other configurations, the number of keys to be generated per time unit is variable. In this case, several different embodiments are possible. According to a first embodiment, it is possible to keep fixed the number of keys per time unit generated by the calculation module, this number of keys being close to the maximum number of required keys. It is also possible to vary parameters of the extension function, in particular the extension ratio. This variation can be dynamic and can correspond to the quantities of data to be encrypted. In order to allow this, as shown in FIG. 2, information coming from the data to be encrypted is returned to the calculation module which will adapt the extension function according to the requirements. These quantities of encryption keys per time unit can be compared to a rate of data to be encrypted.

The number of encryption keys to be generated is an absolute value and can be compared to a quantity, rather than to a rate. This number of keys depends on the absolute quantity of data to be processed. A priori, this quantity is not known at the beginning, which implies that it is difficult to know beforehand the number of initial keys to be generated and the number of encryption keys to be generated from these initial keys.

Several variants are conceivable for solving this problem. According to a first variant, the number of initial keys is not determined beforehand. Initial keys are generated according to the capacity of the security module until information such as an indication of end of communication indicates the stop of the generation of the initial keys.

According to another variant, a fixed number of initial keys is provided, which number can be always the same, or be specified during the initiation of a communication for example. If all the initial keys have been used, it is possible for example to redefine a new quantity of initial keys. It is also possible to use for example the last initial key until the end of the communication.

Still according to another variant, the host sends a piece of information back to the security module, this information allowing this security module to determine the quantity of initial keys it has to generate. This indication is generally dynamic, which means that it is transmitted periodically to the security module.

It is important that the key changes made during encryption and decryption are synchronized, otherwise the decryption might not be achieved. Several methods are conceivable to realize this. In certain of these methods, the communication devices do not exchange information between each other. They use data which are known by the different [0001] entities which communicate between each other. According to a first variant, the number of packets used for each encryption key is fixed and known by the devices which take part in the communication. In this case, it is useless to exchange synchronization information. Only the start of the communication has to be indicated.

According to another variant, the number of packets that each key encrypts depends on a value known by the communication devices, this value being able to vary in the course of the communication. Such a value could for example be the three least significant bits of the last key. Another similar variant could use information connected to the session key as this session key is known by the different entities which take part in the communication. A different variant could use information connected to a clock signal.

In certain other synchronization methods, a piece of synchronization information is exchanged among the devices. This synchronization information could for example be the value of the counter coming from one of the security modules or the value of the index previously mentioned. The synchronization information could also be a command coming from one of the communication devices and indicating to the other device at which moment it has to change encryption key.

This invention thus allows encrypting in an efficient way and with a reduced latency period, data requiring an encryption capacity which may be great, on the basis of a security module having relatively low encryption capacity.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A communication device comprising:
   at least one security processor configured to execute first computer readable instructions to generate a plurality of initial keys using an initial keys generation function based on a session key shared with an external communication device; and
   a host including at least one processor configured to execute second computer readable instructions to,
      receive the initial keys from the at least one security processor,
      generate a plurality of encryption keys from each of the initial keys using an extension function,
      receive the generated encryption keys and communication data to be encrypted, the communication data including a plurality of packets of a desired length equal to a length of each encryption key, and
      combine the communication data and the plurality of encryption keys to generate encrypted data, the combining including combining a single encryption key of the plurality of encryption keys with a desired number of packets to generate the encrypted data using a combination function.

2. The communication device according to claim 1, wherein the at least one processor is further configured to:
   determine a number of encryption keys necessary during a determined time interval of a communication sessions including the communication device and the external communication device; and
   adapt the number of encryption keys generated during the determined time interval based on the determined number of encryption keys necessary.

3. A communication system comprising:
   at least two communication devices configured to exchange data in a secure form with each other, each of the at least two communication devices including at least one security processor and a host;
   each of the at least one security processor configured to execute first computer readable instructions to generate a plurality of initial keys using an initial key generation function based on a session key shared with the other communication device;
   each of the hosts includes at least one processor configured to execute second computer readable instructions to,
      receive the generated initial keys from the corresponding at least one security processor,
      generate a plurality of encryption keys from each of the initial keys received from the corresponding at least one security processor using an extension function,
      receive the generated encryption keys and communication data to be encrypted, the communication data including a plurality of packets of a desired length equal to a length of each encryption key, and
      combine the communication data and the plurality of encryption keys to generate encrypted data, the combining including combining a single encryption key of the plurality of encryption keys with a desired number of packets to generate the encrypted data using a combination function.

4. The communication system according to claim 3, wherein the initial keys generation functions of the at least one security processor of the at least two communication devices are different;
   the extension functions of the two hosts are different; and
   the at least one processor is further configured to use the combination function to decrypt received encrypted communication data from the other communication device based on the plurality of encryption keys generated by the corresponding extension module.

5. The communication system according to claim 3, wherein the at least one security processor of the two communication devices are configured to use the initial keys generation functions and the same session key to generate identical plurality of initial keys; and
   the at least one processor is further configured to use the extension functions of the two communication devices to generate identical encryption keys using the identical plurality of initial keys.

6. A method for processing data in a communication device, the communication device including a host and at least one security processor associated with the host, the method comprising:
   generating, by the at least one security processor, a plurality of initial keys using an initial keys generation function based on a session key shared with an external communication device;
   transmitting, by the at least one security processor, the plurality of initial keys to the corresponding host;
   for each initial key received by the host, generating, by the host, a plurality of encryption keys using an extension function;
   receiving, by the host, communication data to be encrypted, the communication data including a plurality of packets of a desired length equal to a length of each encryption key; and
   combining, by the host, the communication data and the plurality of encryption keys to generate encrypted data, the combining including combining a single encryption key of the plurality of encryption keys with a desired number of packets to generate the encrypted data.

7. The method for processing data according to claim 6, further comprising:
   generating, using the at least one security processor, the plurality of initial keys using the session key as an input variable and the initial keys generation function.

8. The method for processing data according to claim 6, further comprising:

associating each initial key, using the at least one security processor, with an index before transmitting the initial keys and the indexes to corresponding host.

9. The method for processing data according to claim 6, further comprising:
determining a number of encryption keys to be generated using an initial key of the plurality of initial keys based on a parameter depending on the communication data; and
generating, by the host, the determined number of encryption keys.

10. The method for processing data according to claim 9, wherein the parameter is a data rate.

11. The method for processing data according to claim 9, wherein the parameter is a quantity of data.

12. A method for secure data exchange between at least two communication devices, each of the at least two communication devices including a host and at least one security processor associated with the host, the method comprising:
generating a plurality of initial keys using the at least one security processor of each communication device based on a session key shared with the other communication device;
transmitting the plurality of initial keys from the at least one security processor to the corresponding host;
for each of the initial keys received by the host, generating a plurality of encryption keys;
receiving communication data to be encrypted by one of the hosts; and
combining the communication data with the plurality of encryption keys generated by the host to generate encrypted data, the combining including combining a single encryption key of the plurality of encryption keys with a desired number of packets to generate the encrypted data.

13. The method for secure data exchange according to claim 12, wherein the plurality of initial keys generated by the at least two communication devices are different;
the at least two communication devices each include at least one extension function, and the at least one extension function included in the at least two communication devices are different; and
the plurality of encrypted keys are generated based on the plurality of initial keys and the respective extension functions, the plurality of encrypted keys being identical for the two different communication devices.

14. The method for secure data exchange according to claim 12, wherein each of the hosts are configured to:
determine a quantity of encryption keys to be generated per time unit; and
generate the plurality of encryption keys using the extension function based on the determined number of encryption keys per time unit.

15. The method for secure data exchange according to claim 12, wherein the host is configured to:
determine a number of initial keys to be generated by the at least one security processor; and
transmit the determined number of initial keys to be generated to the corresponding at least one security processor.

* * * * *